United States Patent [19]

Clark

[11] Patent Number: 4,884,312

[45] Date of Patent: Dec. 5, 1989

[54] HAND TROWEL

[76] Inventor: Ronald M. Clark, 105 Factory, Addison, Ill. 60101

[21] Appl. No.: 111,928

[22] Filed: Oct. 23, 1987

Related U.S. Application Data

[63] Continuation-in-part of Ser. No. 4,592, Jan. 20, 1987, abandoned.

[51] Int. Cl.[4] ........................ B05C 17/10; E01C 19/12; B23P 17/00

[52] U.S. Cl. ................................ 15/235.4; 15/143 R; 264/273; 29/530

[58] Field of Search .................... 15/235, 235.3, 235.4, 15/235.5, 235.6, 236.7, 235.8, 236, 143 R, 145, 143 A; 16/DIG. 18, DIG. 19, DIG. 24, DIG. 25, 110 R; 425/87, 458; 81/489, 490, 491, 492; 7/167; 264/273; 29/243.5, 243.52, 243.57, 243.58, 527.1, 530; 76/101 D

[56] References Cited

U.S. PATENT DOCUMENTS

| | | | |
|---|---|---|---|
| 917,571 | 4/1909 | Engquist | 15/235.5 |
| 1,225,420 | 5/1917 | Eggert | 16/DIG. 24 |
| 1,550,296 | 8/1925 | Weiland | 15/235.4 |
| 2,162,310 | 6/1939 | Korsen | 15/145 |
| 2,800,013 | 7/1957 | Cesar | 15/235.4 |
| 3,380,097 | 4/1968 | Pharris | 15/145 |
| 4,155,141 | 5/1979 | Guerra | 15/235.7 |
| 4,215,448 | 8/1980 | Burns et al. | 15/145 |
| 4,316,302 | 2/1982 | Clark | 15/245 |
| 4,467,492 | 8/1984 | Harrington | 15/143 R |
| 4,724,572 | 2/1988 | Gringer | 15/235.4 |

FOREIGN PATENT DOCUMENTS

| | | | |
|---|---|---|---|
| 255137 | 10/1964 | Australia | 15/235.4 |
| 2001072 | 7/1971 | Fed. Rep. of Germany | 15/235.4 |
| 2349730 | 4/1975 | Fed. Rep. of Germany | 15/235.3 |
| 3209011 | 9/1983 | Fed. Rep. of Germany | 15/235.8 |
| 1076525 | 7/1967 | United Kingdom | 15/235.4 |

*Primary Examiner*—Harvey C. Hornsby
*Assistant Examiner*—Joseph S. Machuga
*Attorney, Agent, or Firm*—Robert F. Van Epps

[57] ABSTRACT

A metal blade trowel having a handle formed of a thermoplastic material directly attached by injection molding through an elongate aperture extending along the longitudinal centerline of the blade.

2 Claims, 2 Drawing Sheets

HAND TROWEL

RELATED APPLICATION DATA

This application is a continuation-in-part of my co-pending application Ser. No. 004,592 filed on Jan. 20, 1987 now abandoned.

BACKGROUND OF THE INVENTION

1. Field of the Invention

The present invention relates generally to the field of hand tools and more particularly to a new and improved hand trowel.

2. Description of the Prior Art

Prior to the present invention hand trowels have been well known in the art for applying and smoothing various materials such as plaster, cement and the like. The typical prior art trowel consists of a generally rectangular metal blade to which a handle support is fixed by rivets or welding. A wood or plastic grip is then fitted to the support. Such an assembly requires several operations to complete. The handle support is either welded to the upper surface of the blade or is riveted through the blade and then the rivets are ground to provide a flat surface. A variation of the prior art structure is described in U.S. Pat. No. 4,467,492 which issued to Harrington on Aug. 28, 1984. That trowel comprises a metal blade to which a longitudinally extending metallic rib is attached by welding or riveting. A metallic U-shaped support strut is assembled to the rib. The rib and strut are then encapsulated in a synthetic resinous material to form a hand grip and to conceal the rib and strut assembly. The Harrington trowel still requires a multi-step assembly operation in addition to the plastic molding operation.

An all thermoplastic trowel is disclosed in the U.S. Pat. No. 4,316,302 which issued to the present inventor on Feb. 23, 1982. That trowel, while suitable for many purposes, is not intended for long term professional types of uses.

OBJECTIVES AND SUMMARY OF THE INVENTION

From the preceding discussion it will be understood that among the various objectives of the present invention are included the following:

- the provision of a new and improved hand trowel;
- the provision of an apparatus of the above-described character having a thermoplastic handle formed directly to a metal blade.

These and other objectives of the present invention are efficiently achieved by providing a flat metal blade with a plurality of holes or preferably a slot generally along the longitudinal centerline thereof. A handle is formed of a thermoplastic material by injection molding whereby the handle material flows through the slot and spreads outwardly along the lower surface of the blade centerline. The handle is thereby formed and secured to the blade in a single operation without producing deformation of the blade as the thermoplastic material shrinks upon cooling.

The foregoing as well as other objects, features and advantages of the present invention will become more apparent from the following detailed description taken in conjunction with the various views of the appended drawings.

DESCRIPTION OF PREFERRED EMBODIMENT

Figure 1:
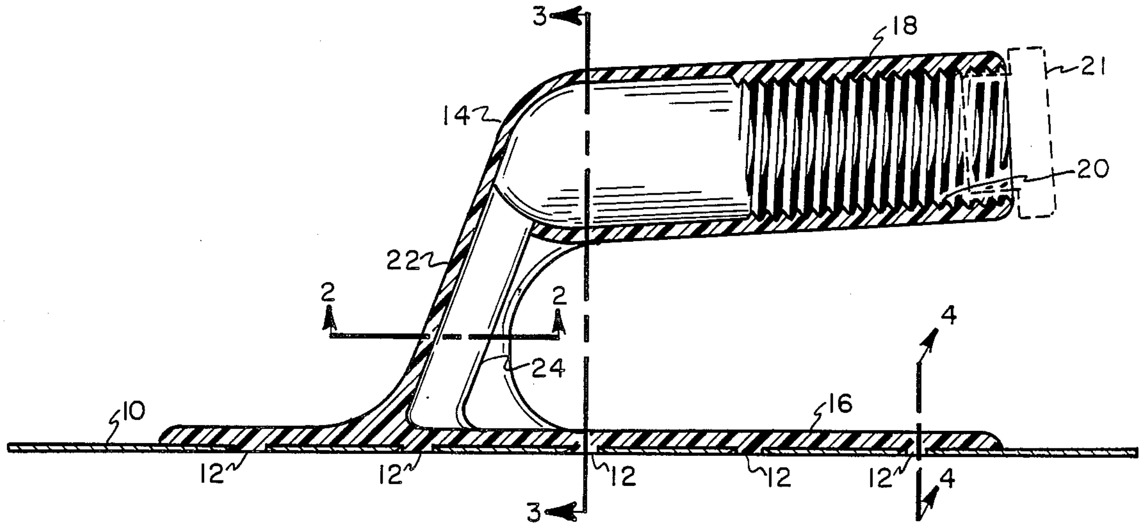
FIG. 1 is a longitudinal cross-section view of a hand trowel in accordance with the present invention.

With reference now to FIG. 1 there is shown in longitudinal cross-section a hand trowel constructed in accordance with the principles of the present invention. A metal blade 10 is provided wth a plurality of through-holes 12 substantially along the longitudinal centerline. A handle 14 is formed of a thermoplastic material such as a high impact styrene and injection molded directly to the blade 10.

The through-holes 12 are tapered outwardly from the upper to lower surface of the blade 10 such that the thermoplastic material flows through the blade and, upon setting, secures the base 16 of handle 14 to the blade 10 in a single operation.

Figure 2:
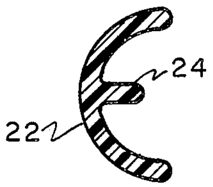
FIG. 2 is a cross-section view of the hand trowel of FIG. 1 along section line 2—2.

While the handle 14 could be formed as a solid structure, in order to conserve material and provide economical production, the grip portion 18 of the handle 14 is preferably hollow and may easily be internally threaded 20 to accommodate an extension handle (not shown) or could be provided with an end cap 21 (shown in phantom) to create a storage compartment. To provide structural integrity, the cantilever portion 22 of the handle 14 may be provided with a reinforcing ridge 24 but for ease of molding is preferred to be open to the rear as shown in the cross-section view of FIG. 2.

Figure 3:
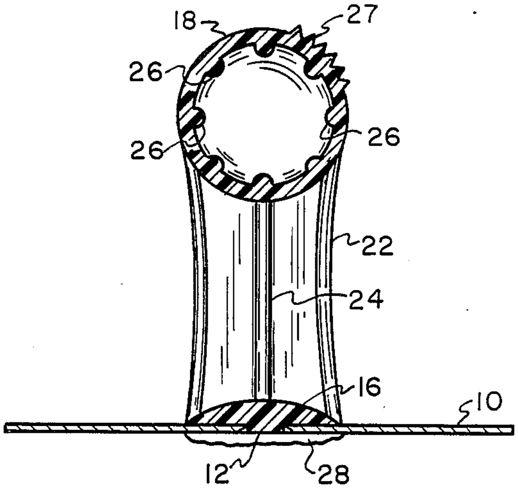
FIG. 3 is a transverse cross-section view of the hand trowel of FIG. 1 along section line 3—3.

FIG. 3 is a transverse cross-section view of the hand trowel of FIG. 1 along section line 3—3 wherein like elements are identified by like reference characters. As an alternative to the internal threading 20 shown in FIG. 1 the internal surface of the grip 18 may be provided with longitudinal ribs 26 for structural reinforcement. Fine ribbing, etching or other roughening of the outer surface of the grip 18 may also be used as shown in part at 27 of FIG. 3. Also, since most hand trowels of the type illustrated are used primarily at the edges of the blade 10 the thermoplastic material may be allowed to overflow the through-holes 12 to form a longitudinal plate 28 along the bottom centerline of the blade 10 to thereby provide increased structural integrity of the handle attachment.

Figure 4:
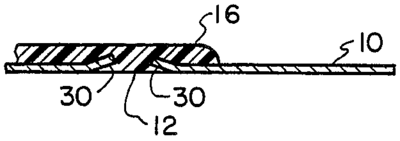
FIG. 4 is a detail section view of the hand trowel of FIG. 1 along section line 4—4.
Figure 5:
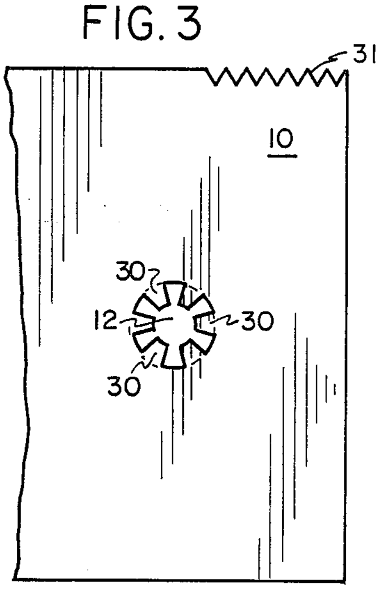
FIG. 5 is a detailed view of one embodiment of a through-hole in the blade of the hand trowel of FIG. 1.

FIGS. 4 and 5 illustrate one through-hole configuration particularly useful in the practice of the present invention. The through-hole 12 is cut such as to leave a plurality of inwardly extending tabs 30 which also extend upwardly from the upper surface of the blade 10 to leave a truncated cone shaped cavity flush with the lower surface. The handle base 16 is thus securely attached to the blade 10. FIG. 5 also illustrates that one or more edges of the blade 10 may be provided with notches 31 of any selected configuration for spreading adhesives and the like.

In the molding of thermoplastic materials, as the plastic sets or cools it shrinks. By way of example, polypropylene will shrink from 0.01 to 0.025 inch per inch as it cools from molding temperatures to ambient temperature. In actual practice the Applicant has found that using the blade configuration of FIG. 1 with the plurality of individual through-holes, contraction of the thermoplastic material introduces stress which causes the blade to arc upwardly at its ends. While in some applications an arcuate blade may be satisfactory or even desirable, other applications require that the blade be substantially flat.

Figure 6A:
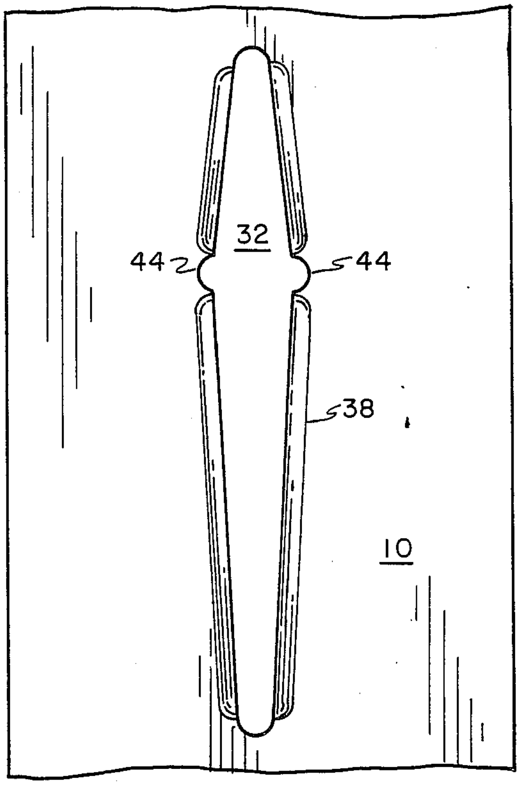
FIGS. 6A–6C are three illustrative examples of longitudinally extending centerline slot configurations useful in the practice of the invention.
Figure 6B:
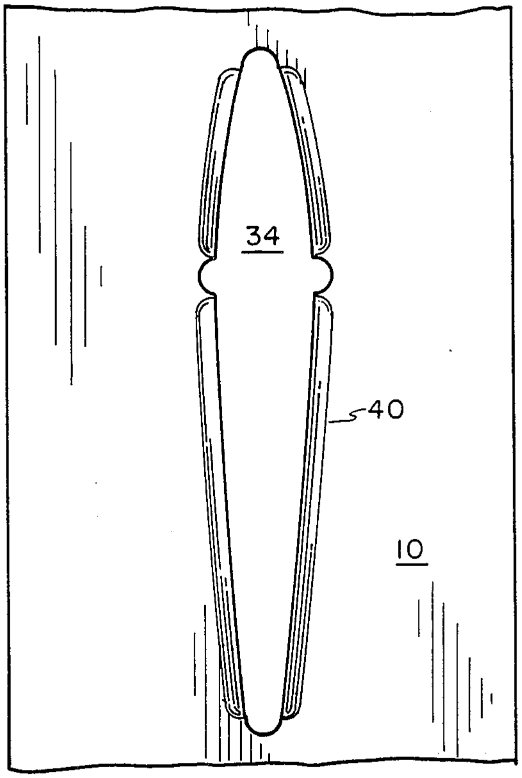
Figure 6C:
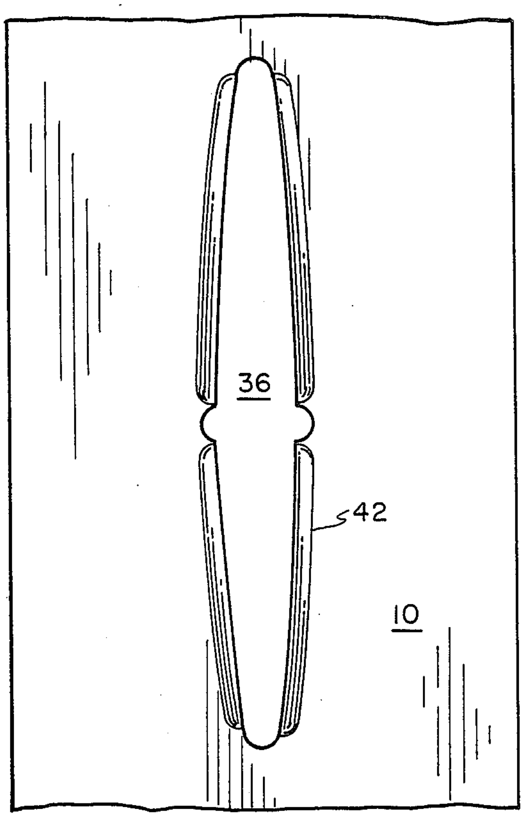

In order to substantially eliminate the shrinkage induced stress, the Applicant has found that an elongate slot disposed along the longitudinal centerline of the blade 10 of FIG. 1 performs much more efficiently than the plurality of individual through-holes. Particular configurations for the slot which have been found by the Applicant to be useful are illustrated in FIGS. 6A–C and include diamond 32, teardrops 34 and ellipsoid 36 shapes. As with the individual through-holes the blade 10 at the edges 38, 40 and 42 of the respective slots 32, 34 and 36 are pitched upwardly to thereby provide a cavity on the underside of the blade 10 such that thermoplastic material flowing through the slot will remain flush with the lower surface of blade 10. The edges 38–42 are cut away adjacent the ends of the slots 32–36 so as not to restrain the longitudinal contraction of the thermoplastic material as it cools. The plastic shrinkage may be further controlled by notching the upturned slot edges as shown at 44 of FIG. 6A. By using two notches 44 opposite one another, the plastic shrinkage is divided into two components, one extending longitudinally in each direction.

The Applicant has found that the hand trowel of the present invention is efficiently and economically fabricated by clamping the blade 10 in an injection molding die in a molding machine. Thus the molding process yields the completely finished tool. As an alternative to the above-described construction the entire tool could be molded as a unitary structure from a thermoplastic or thermosetting material. A rubber pad could also be affixed to the underside of the blade such as to provide a grout float. It will therefore be seen that the Applicant has provided a new and improved metal blade hand trowel whereby the multi-step assembly requirements of the prior art are overcome. Since certain changes in the above-described construction will occur to those skilled in the art without departure from the scope of the invention, it is intended that all matter contained in the above description or shown in the appended drawings shall be interpreted as illustrative and not in a limiting sense.

Having described what is new and novel and desired to secure by Letters Patent, what is claimed is:

1. A hand trowel comprising a substantially flat blade having an elongate slot disposed therethrough substantially along the longitudinal centerline thereof, said slot being provided with at least one pair of opposed outwardly extending notches disposed at a point intermediate and spaced from the ends of the slot:

a handle formed entirely of a thermoplastic material having a base portion molded to said blade such that said material flows through said slot and sets on both sides of said blade to thereby secure said handle to said blade without substantial deformation of said blade;

said opposed outwardly extending notches operating to divide shrinkage of said thermoplastic material as the same sets into at least two longitudinal components.

2. A method of making a hand trowel comprising the steps of forming a substantially flat metal blade;

forming an elongate slot through and substantially along the longitudinal centerline of said blade;

bending the edges of said blade adjacent the sides of said elongate slot upwardly to thereby provide a cavity in the underside of said blade;

forming at least one pair of opposed notches in the edges of said elongate slot intermediate the ends thereof;

placing said blade in an injection molding die adapted for forming a handle;

injecting a thermoplastic material into said molding die such that said material passes through said elongate slot and sets on the underside of said blade opposite said handle;

to thereby produce a hand trowel having an entirely thermoplastic handle intergrally formed with said blade.

* * * * *